(12) United States Patent
Sundaram

(10) Patent No.: US 9,690,934 B1
(45) Date of Patent: Jun. 27, 2017

(54) SYSTEMS AND METHODS FOR PROTECTING COMPUTING DEVICES FROM IMPOSTER ACCESSIBILITY SERVICES

(71) Applicant: Symantec Corporation, Mountain View, CA (US)

(72) Inventor: Ramakrishnan Meenakshi Sundaram, Tami Nadu (IN)

(73) Assignee: Symantec Corporation, Mountain View, CA (US)

( * ) Notice: Subject to any disclaimer, the term of this patent is extended or adjusted under 35 U.S.C. 154(b) by 130 days.

(21) Appl. No.: 14/837,383

(22) Filed: Aug. 27, 2015

(51) Int. Cl.
  *G06F 21/56* (2013.01)
  *G06F 21/62* (2013.01)

(52) U.S. Cl.
  CPC .......... *G06F 21/56* (2013.01); *G06F 21/6227* (2013.01); *G06F 2221/033* (2013.01)

(58) Field of Classification Search
  CPC ......... G06F 21/30; H04L 63/10; H04W 12/08
  USPC ....... 726/1–4, 23–26; 455/401; 713/153–155
  See application file for complete search history.

(56) References Cited

U.S. PATENT DOCUMENTS

| | | |
|---|---|---|
| 6,282,709 B1 | 8/2001 | Reha et al. |
| 2002/0122051 A1 | 9/2002 | Hose et al. |
| 2006/0242712 A1 | 10/2006 | Linn et al. |
| 2010/0229220 A1 | 9/2010 | Tsai et al. |
| 2011/0047620 A1 | 2/2011 | Mahaffey et al. |
| 2011/0154490 A1 | 6/2011 | DeLuca et al. |
| 2012/0173699 A1* | 7/2012 | Niemela ............... H04L 63/101 709/224 |
| 2012/0243043 A1 | 9/2012 | Asai |
| 2012/0246630 A1 | 9/2012 | Kuzins et al. |
| 2013/0247021 A1 | 9/2013 | You |
| 2013/0254880 A1 | 9/2013 | Alperovitch et al. |
| 2013/0283377 A1* | 10/2013 | Das ......................... G06F 21/51 726/23 |
| 2013/0333039 A1* | 12/2013 | Kelly ...................... G06F 21/51 726/24 |

(Continued)

FOREIGN PATENT DOCUMENTS

WO    WO-00/60488    10/2000

OTHER PUBLICATIONS

Machigar Ongtan, Semantically Rich Application-centric security in Android, Aug. 23, 2011, Wiley Online Library, vol. 10.1002, pp. 6-26.*

(Continued)

*Primary Examiner* — Dede Zecher
*Assistant Examiner* — Viral Lakhia
(74) *Attorney, Agent, or Firm* — FisherBroyles LLP

(57) ABSTRACT

The disclosed computer-implemented method for protecting computing devices from imposter accessibility services may include (1) registering a security application with the computing device as an accessibility service that has special permissions on the computing device that are not available to other applications, (2) ensuring that the security application is the first registered accessibility service on the computing device, and (3) performing, by the security application, a security action after ensuring that the security application is the first registered accessibility service. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2013/0347070 | A1* | 12/2013 | Cairns | H04L 63/126 726/3 |
| 2014/0090077 | A1* | 3/2014 | Jeong | G06F 21/60 726/26 |
| 2014/0096246 | A1* | 4/2014 | Morrissey | G06F 21/51 726/23 |
| 2014/0109186 | A1 | 4/2014 | Oikonomidis | |
| 2014/0317610 | A1 | 10/2014 | Belfoure et al. | |
| 2014/0359098 | A1* | 12/2014 | Xu | H04L 67/10 709/223 |
| 2014/0373104 | A1* | 12/2014 | Gaddam | H04L 63/105 726/4 |
| 2015/0180746 | A1* | 6/2015 | Day, II | H04L 51/16 455/405 |
| 2016/0127416 | A1* | 5/2016 | Park | H04W 4/008 726/1 |
| 2016/0267267 | A1* | 9/2016 | Hu | G06F 21/51 |
| 2016/0323307 | A1* | 11/2016 | Savant | G06F 21/6218 |
| 2016/0344726 | A1* | 11/2016 | Stojanovski | H04W 12/04 |

OTHER PUBLICATIONS

"Sending Simple Data to Other Apps", http://developer.android.com/training/sharing/send.html, as accessed Jan. 7, 2014, (Jan. 4, 2012).

"Google Play", http://en.wikipedia.org/wiki/Google_Play, as accessed Jan. 7, 2014, Wikipedia, (Mar. 7, 2012).

Anubhav Savant; Systems and Methods for Informing Users About Applications Available for Download; U.S. Appl. No. 14/178,279, filed Feb. 12, 2014.

Zeqing Qi, et al; Systems and Methods for Updating Applications; U.S. Appl. No. 14/305,497, filed Jun. 16, 2014.

Anubhav Savant; Systems and Methods for Providing Information Identifying the Trustworthiness of Applications on Application Distribution Platforms; U.S. Appl. No. 14/338,539, filed Jul. 23, 2014.

Anubhav Savant, et al; Systems and Methods for Modifying Applications Without User Input; U.S. Appl. No. 14/445,704, filed Jul. 29, 2014.

"AccessibilityService", http://developer.android.com/reference/android/accessibilityservice/AccessibilityService.html, as accessed May 30, 2014, Android, (Nov. 15, 2009).

"Digital distribution", http://en.wikipedia.org/wiki/Digital_distribution, as accessed May 30, 2014, Wikipedia, (Jun. 15, 2005).

"Building Accessibility Services", http://developer.android.com/guide/topics/ui/accessibility/services.html, as accessed May 30, 2014, Android, (Apr. 14, 2012).

Anubhav Savant; Systems and Methods for Evaluating Content Provided to Users via User Interfaces; U.S. Appl. No. 14/698,885, filed Apr. 29, 2015.

"ApplicationId versus PackageName", http://tools.android.com/tech-docs/new-build-system/applicationid-vs-packagename, as accessed Mar. 3, 2015, Android Tools Project Site, (Oct. 3, 2014).

Beal, Vangie "API—application program interface", http://www.webopedia.com/TERM/A/API.html, as accessed Mar. 3, 2015, Webopedia, (Jun. 21, 2000).

"AccessibilityEvent", http://developer.android.com/reference/android/view/accessibility/AccessibilityEvent.html, as accessed Mar. 3, 2015, Android Developers, (Oct. 10, 2009).

"Greenify", https://play.google.com/store/apps/details?id=com.oasisfeng.greenify&hl=en, as accessed May 30, 2014, (Jun. 19, 2013).

"Receiving Simple Data from Other Apps", http://developer.android.com/training/sharing/receive.html, as accessed Jan. 7, 2014, (Jan. 3, 2012).

Christopher Woodward; Systems and Methods for Detecting Advertisements Displayed to Users Via User Interfaces; U.S. Appl. No. 14/812,707, filed Jul. 29, 2015.

Ramakrishnan Meenakshi Sundaram; Systems and Methods for Enabling Parental Control Applications to Enforce Rules on Third-Party Applications; U.S. Appl. No. 14/817,236, filed Aug. 4, 2015.

Jonathon Salehpour; Systems and Methods for Detecting When Users Are Uninstalling Applications; U.S. Appl. No. 14/824,539, filed Aug. 12, 2015.

"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).

"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).

"Packagelnstaller", https://developer.android.com/reference/android/content/pm/Packagelnstaller.html, as accessed Jun. 25, 2015, Android Developers, (Oct. 20, 2014).

"AccessibilityService", http://developer.android.com/reference/android/accessibilityservice/AccessibilityService.html, as accessed Jun. 25, 2015, Android Developers, (Nov. 15, 2009).

"Developing an Accessibility Service", http://developer.android.com/training/accessibility/service.html, as accessed Jun. 25, 2015, Android Developers, (Apr. 13, 2012).

"AlertDialog", http://developer.android.com/reference/android/app/AlertDialog.html, as accessed Jun. 25, 2015, Android Developers, (Feb. 18, 2009).

"Artimys", https://artimysapi.appspot.com/, as accessed Jun. 4, 2015, (2013).

Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).

"android.accessibilityservice", https://developer.android.com/reference/android/accessibilityservice/package-summary.html, as accessed Jun. 4, 2015, Android Developers, (Sep. 22, 2009).

Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).

"Adblock Plus", https://adblockplus.org/, as accessed Jun. 4, 2015, (Aug. 21, 2006).

"AccessibilityEvent", http://developer.android.com/reference/android/view/accessibility/AccessibilityEvent.html, as accessed Jun. 4, 2015, Android Developers, (Oct. 10, 2009).

* cited by examiner

SYSTEMS AND METHODS FOR PROTECTING COMPUTING DEVICES FROM IMPOSTER ACCESSIBILITY SERVICES

BACKGROUND

Malicious applications are a common problem on all types of computing devices. Malware can range from viruses to adware to Trojans and can cause many types of damage to computing devices. Some types of malware display advertisements, while other types of malware link the computing device to a botnet. Some very common types of malware steal personal information from computing devices. Stolen information can cause damage to a user in a variety of ways. For example, stolen information may be used for identity theft or to withdraw money from financial accounts. To combat this problem, some computing devices limit the amount of information that any given application is able to view.

However, accessibility services on computing devices may not be limited in this way. Because accessibility services such as screen readers need access to all of the text on the screen, computing devices may allow accessibility services special permissions that are not available to other applications. This means that malware masquerading as accessibility services may have access to a large amount of personal information. Malware applications that are registered first in the list of accessibility services may be first in line to intercept events and may therefore pose the biggest threat. Accordingly, the instant disclosure identifies and addresses a need for additional and improved systems and methods for protecting computing devices from imposter accessibility services.

SUMMARY

As will be described in greater detail below, the instant disclosure describes various systems and methods for protecting computing devices from imposter accessibility services by registering a security application as an accessibility service, determining whether the security application is the first registered accessibility service, and remediating the situation if the security application is not the first registered accessibility service.

In one example, a computer-implemented method for protecting computing devices from imposter accessibility services may include (1) registering a security application with the computing device as an accessibility service that has special permissions on the computing device that are not available to other applications, (2) ensuring that the security application is the first registered accessibility service on the computing device, and (3) performing, by the security application, a security action after ensuring that the security application is the first registered accessibility service.

In some examples, ensuring that the security application is the first registered accessibility service may include (1) triggering an event on the computing device that will be intercepted by the first registered accessibility service for the computing device, (2) determining, based on the security application not intercepting the event, that the security application is not the first registered accessibility service for the computing device, and (3) performing a remedial action in response to determining that the security application is not the first registered accessibility service for the computing device. In some examples, performing the remedial action may include prompting a user to configure the computing device such that the security application is the first registered accessibility service. Additionally or alternatively, performing the security action may include blocking a malware application from registering itself as the first registered accessibility service due to having the security application already registered as the first registered accessibility service.

In one embodiment, the security action may include querying the computing device for a list of registered accessibility services and querying a reputation database for a reputation for each accessibility service in the list of registered accessibility services. In some examples, the computer-implemented method may further include notifying the user of a negative reputation of a registered accessibility service in response to receiving a reply from the reputation database indicating that the registered accessibility service has a negative reputation. Additionally or alternatively, the computer-implemented method may further include prompting the user to provide a reputation rating for a registered accessibility service in response to receiving a reply from the reputation database indicating that the registered accessibility services has not yet been assigned a reputation score.

In one embodiment, the computing device may include a mobile device. In one example, the security action may include (1) determining that a user is viewing a downloadable application, (2) determining that the downloadable application will attempt to register as an accessibility service once downloaded to the computing device, and (3) adjusting a reputation score of the downloadable application based on determining that the downloadable application will attempt to register as an accessibility service.

In one embodiment, a system for implementing the above-described method may include (1) a registration module, stored in memory, that registers a security application with the computing device as an accessibility service that has special permissions on the computing device that are not available to other applications, (2) an ensuring module, stored in memory, that ensures that the security application is the first registered accessibility service on the computing device, (3) a security module, stored in memory, that performs, by the security application, a security action after ensuring that the security application is the first registered accessibility service, and (4) at least one physical processor configured to execute the registration module, the ensuring module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) register a security application with the computing device as an accessibility service that has special permissions on the computing device that are not available to other applications, (2) ensure that the security application is the first registered accessibility service on the computing device, (3) perform, by the security application, a security action after ensuring that the security application is the first registered accessibility service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
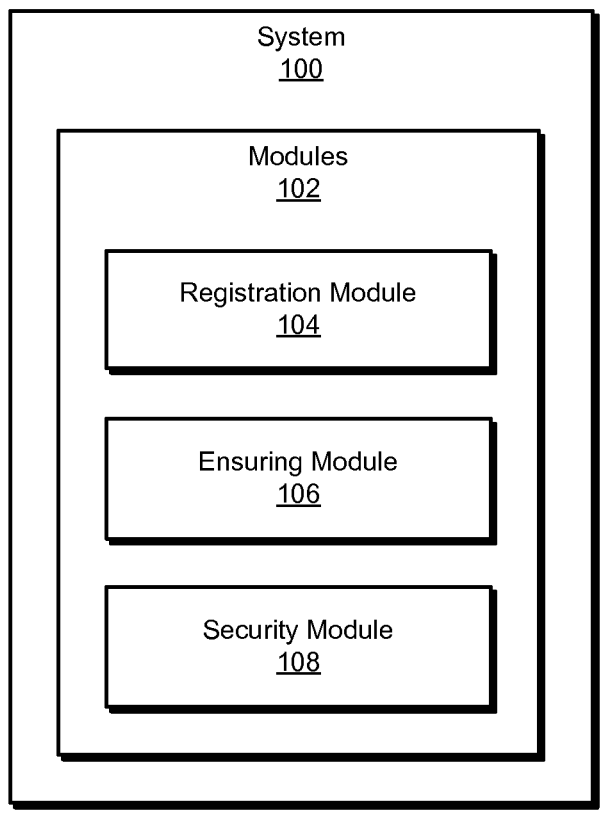
FIG. 1 is a block diagram of an exemplary system for protecting computing devices from imposter accessibility services.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting computing devices from imposter accessibility services. As will be explained in greater detail below, by registering a security application as the first registered accessibility service, the systems and methods described herein may allow the security application to take otherwise unavailable security actions, such as blocking malware from registering as the first registered accessibility service. Additionally, the security application may protect a user from malware by providing the user with reputation ratings for other registered accessibility services and/or modify the reputation ratings of applications that attempt to register as accessibility services.

Figure 2:
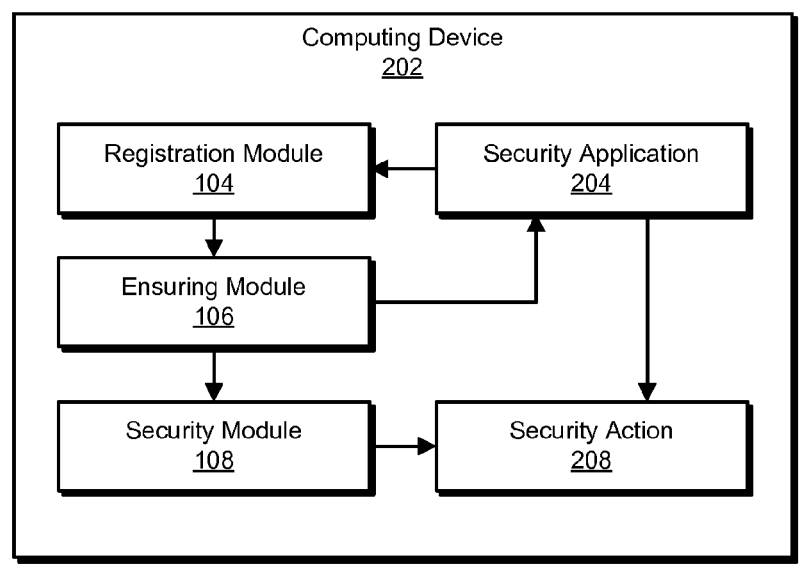
FIG. 2 is a block diagram of an additional exemplary system for protecting computing devices from imposter accessibility services.

The following will provide, with reference to FIGS. 1-2, detailed descriptions of exemplary systems for protecting computing devices from imposter accessibility services. Detailed descriptions of corresponding computer-implemented methods will also be provided in connection with FIG. 3. Detailed descriptions of exemplary computer-implemented methods for determining the reputation of registered accessibility services and modifying the reputation of registered accessibility services will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting computing devices from imposter accessibility services. As illustrated in this figure, exemplary system 100 may include one or more modules 102 for performing one or more tasks. For example, and as will be explained in greater detail below, exemplary system 100 may include a registration module 104 that registers a security application with the computing device as an accessibility service that has special permissions on the computing device that are not available to other applications. Exemplary system 100 may additionally include an ensuring module 106 that ensures that the security application is the first registered accessibility service on the computing device. Exemplary system 100 may also include a security module 108 that performs, by the security application, a security action after ensuring that the security application is the first registered accessibility service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to protect computing devices from imposter accessibility services. For example, and as will be described in greater detail below, registration module 104 may register a security application 204 with computing device 202 as an accessibility service that has special permissions on computing device 202 that are not available to other applications. Next, ensuring module 106 may ensure that security application 204 is the first registered accessibility service on computing device 202. At any later time, security module 108 may perform, by security application 204, a security action 208 after ensuring that security application 204 is the first registered accessibility service.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
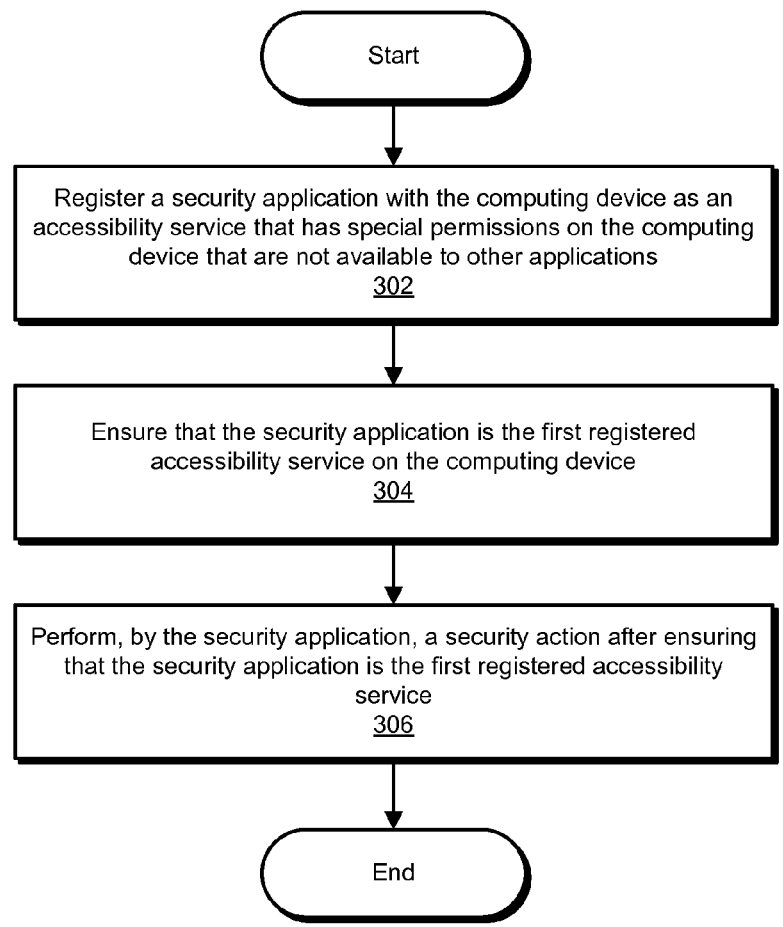
FIG. 3 is a flow diagram of an exemplary method for protecting computing devices from imposter accessibility services.

FIG. 3 is a flow diagram of an exemplary computer-implemented method 300 for protecting computing devices from imposter accessibility services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may register a security application with the computing device as an accessibility service that has special permissions on the computing device that are not available to other applications. For example, registration module 104 may, as part of computing device 202 in FIG. 2, register security application 204 with computing device 202 as an accessibility service that has special permissions on computing device 202 that are not available to other applications.

The term "security application," as used herein, generally refers to any application designed and/or configured to protect a computing device from malicious activity. In some embodiments, the security application may include an anti-malware application. For example, the security application may be NORTON MOBILE SECURITY.

The term "accessibility service," as used herein, generally refers to any service designed to provide alternative or augmented feedback to a user of a computing device. For example, an accessibility service may assist users with audio or visual impairments (e.g., by reading text displayed on a screen, highlighting or enlarging certain elements of a user interface, etc.). Additionally or alternatively, an accessibility service may assist users who are temporarily unable to fully interact with their computing device.

In some embodiments, an accessibility service may monitor user interfaces by detecting a state transition in a user interface. For example, an accessibility service may detect user interactions with a computing device, such as by detecting that a user has clicked a button, changed the focus of a screen (e.g., by zooming in), entered text into an input field, etc. An accessibility service may also detect changes in user interfaces produced by an application or operating system running on a computing device, such as by determining that an application is executing, identifying a prompt requesting user input, detecting an audio notification, etc.

Specifically, in some examples, an accessibility service may detect changes in user interfaces by receiving event notifications. The term "event notification," as used herein, generally refers to any type or form of electronic message or portion of code distributed to an accessibility service in response to a state transition in one or more user interfaces. In some examples, event notifications may be generated only when an accessibility service and/or certain permissions are enabled on a computing device. In addition, event notifications may contain a variety of information associated with a user interface transition. For example, an event notification may simply alert an accessibility service that a change has occurred. In addition, an event notification may contain information indicating what type of change occurred. As an example, in an ANDROID operating system, an event notification of the type "TYPE_TOUCH_INTERACTION_START" may indicate that a user has begun to touch the touchscreen of a computing device. In addition, an event notification of the type "TYPE_WINDOW_STATE_CHANGED" may indicate that a pop-up window, menu, or dialog box has appeared on the screen of a computing device. Furthermore, in addition to labelling the type of event that occurred in a user interface, an event notification may include information that describes the origin and/or content of the event. For example, an accessibility service may request that an event notification include the time that the event occurred, information about the source of the event, as well as the layout and content of the active window of the computing device at the time the event occurred. The term "active window," as used herein, generally refers to any user interface, notification, or audio-visual display that is currently presented to a user on the screen of a computing device.

In some embodiments, accessibility services may be granted special permissions on the computing device in order to provide feedback and/or monitor events. The term "special permissions," as used herein, generally refers to any permissions provided to one class of services or applications that are not provided to all classes of services or applications. In some embodiments, the special permissions provided to accessibility services may include the ability to intercept events and/or event notifications triggered by any application on the computing device, as described above. In some embodiments, these abilities may be special permissions because most applications may not have access to content and/or events within other applications.

Registration module 104 may register the security application as an accessibility service in a variety of ways. For example, registration module 104 may present the security application as an accessibility service to an application programming interface (API) that handles accessibility service registration for the computing device. In another embodiment, registration module 104 may set a flag in the security application metadata that identifies the parental control application as an accessibility service.

In one embodiment, the computing device may include a mobile device. For example, the computing device may be an ANDROID mobile phone. Additionally or alternatively, the computing device may be a laptop, tablet, and/or any other brand of mobile phone.

At step 304, one or more of the systems described herein may ensure that the security application is the first registered accessibility service on the computing device. For example, ensuring module 106 may, as part of computing device 202 in FIG. 2, ensure that security application 204 is the first registered accessibility service on computing device 202.

The term "first registered accessibility service," as used herein, generally refers to the accessibility service that is first in the list of services to intercept events of any type on the computing device. In some embodiments, if the first registered accessibility service is registered to intercept events of a certain type, no other accessibility service may receive notifications of events of that type. For example, if the first registered accessibility service has elected to receive notifications about "TYPE_WINDOW_STATE_CHANGED" events, no other accessibility service will receive notifications about window state changes, even if other accessibility services have registered to receive window state change notifications.

Ensuring module 106 may ensure that the security application is the first registered accessibility service in a variety of ways. For example, ensuring module 106 may send a message to the API that handles accessibility services indicating that the security application should be the first registered accessibility service. In some examples, ensuring module 106 may determine that the security application is already registered as the first registered accessibility service.

In some examples, ensuring module 106 may ensure that the security application is the first registered accessibility service by triggering an event on the computing device that will be intercepted by the first registered accessibility service for the computing device, determining, based on the security application not intercepting the event, that the security application is not the first registered accessibility service, and performing a remedial action in response to determining that the security application is not the first registered accessibility service for the computing device. For example, the security application may register to intercept button click events and then trigger a button click event. In this example, the security application may not intercept the button click event, demonstrating that another accessibility service is registered to intercept button clicks and is higher on the accessibility service registration hierarchy.

In some examples, after determining that the security application is not the first registered accessibility service, ensuring module 106 may perform the remedial action by prompting a user to configure the computing device such that the security application is the first registered accessibility services. For example, ensuring module 106 may display a notification to the user with directions for reconfiguring the computing device. Additionally or alternatively, ensuring module 106 may take other remedial actions, such as making a call to an API that handles accessibility service registration and/or ordering. In some embodiments, ensuring module 106 may automatically uninstall and/or reinstall other accessibility services so that the security application is the first registered accessibility service.

At step 306, one or more of the systems described herein may perform, by the security application, a security action after ensuring that the security application is the first registered accessibility service. For example, security module 108 may, as part of computing device 202 in FIG. 2, perform, by security application 204, security action 208 after ensuring that security application 204 is the first registered accessibility service.

Security module 108 may perform a variety of different security actions. For example, security module 108 may perform the security action by blocking a malware application from registering itself as the first registered accessibility service due to having the security application already registered as the first registered accessibility service. In some embodiments, the security application may have registered to receive event notifications for all event types and thus may prevent the malware application from receiving any notifications, as only the first registered service for each event type receives notifications. In this example, security module 108 may also alert a user of the computing device that a malware application attempted to register as an accessibility service.

Figure 4:
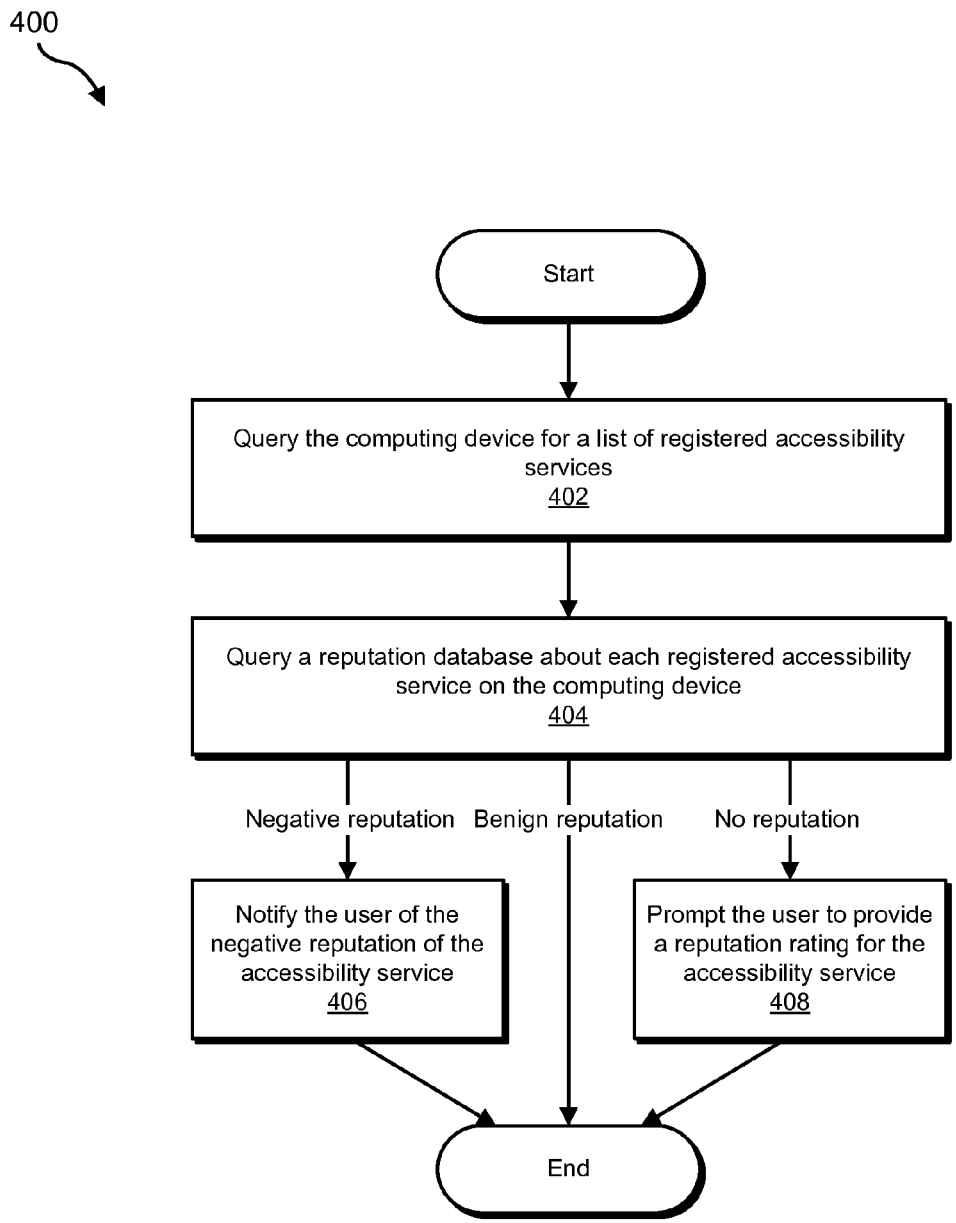
FIG. 4 is a flow diagram of an exemplary method for determining the reputation of registered accessibility services.

In some embodiments, security module 108 may perform a security action that alerts a user to potential malware that is masquerading as an accessibility service on the computing device. For example, security module 108 may determine the reputation of accessibility services installed on the computing device. FIG. 4 is a flow diagram of an exemplary method 400 for determining the reputations of accessibility services. At step 402, the systems described herein may query the computing device for a list of registered accessibility services. At step 404, the systems described herein may query a reputation database for a reputation for each accessibility service in the list of registered accessibility services. If an accessibility service has a negative reputation, at step 406 the systems described herein may notify the user of the negative reputation of the registered accessibility service. If an accessibility service has a benign, positive, and/or neutral reputation, the systems described herein may take no action in regards to that accessibility service. If an accessibility service has no reputation or insufficient reputation data, at step 408 systems described herein may prompt the user to provide a reputation rating for the accessibility service that can be used to calculate a reputation score for the accessibility service.

In some embodiments, reputation scores may include a numerical component. For example, a reputation score may range from 0-100 where 0 represents known malware and 100 represents absolutely trustworthy applications. Additionally or alternatively, reputation scores may include words or phrases, such as "known malware," "unknown application," and/or "trustworthy." In some embodiments, the reputation rating of an application may be based at least in part on how many devices the application is installed on. Additionally or alternatively, the reputation score may be based at least in part on a manual evaluation of the application by a security expert.

Figure 5:
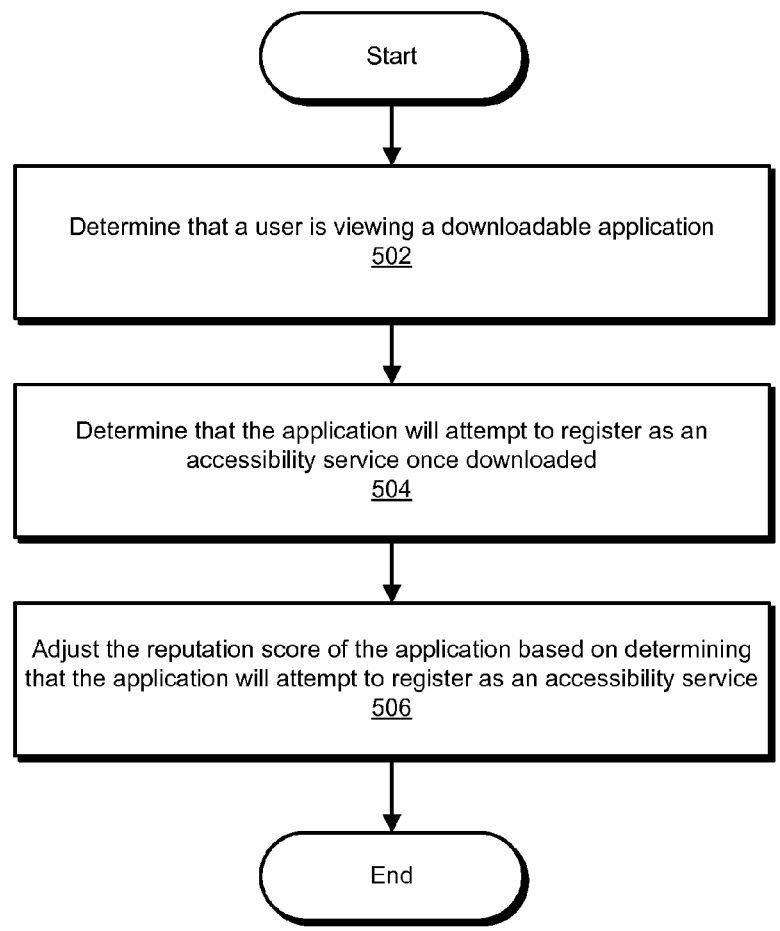
FIG. 5 is a flow diagram of an exemplary method for adjusting the reputation of accessibility services.

In some embodiments, security module 108 may modify the reputation of an application based on determining that it will attempt to register as an accessibility service. FIG. 5 is a flow diagram of an exemplary method 500 for modifying the reputation of an application. At step 502, the systems described herein may determine that a user is viewing a downloadable application. For example, a user may be viewing an application in a mobile device app store. At step 504, the systems described herein may determine that the downloadable application will attempt to register as an accessibility service once downloaded to the computing device. In some embodiments, the systems described herein may retrieve this information from a database of application data. In other embodiments, the systems described herein may scan metadata about the application. At step 506, the systems described herein may adjust the reputation score of the downloadable application based on determining that the downloadable application will attempt to register as an accessibility service. For example, the systems described herein may lower the reputation of an application that will attempt to register as an accessibility service if the application is not actually an accessibility service. In some examples, the application may be malware that will use the special permission granted to accessibility services to take malicious actions, such as stealing sensitive information.

As described in connection with method 300 above, the systems and methods described herein may protect mobile devices from malware in several different ways. A security application may generate accessibility events, check to see whether it is receiving them, and prompt a user to de-register other accessibility services if the security application does not receive the accessibility events. The security application may then prevent malware from registering as accessibility services. In some examples, the security application may also get a list of installed and/or running accessibility services on the device and warn the user about any malicious services installed. The security application may also lower the reputation rating of suspicious applications that attempt to register as accessibility services but should not need the special permissions granted to accessibility services. In these ways, the security application may protect a user's privacy and security by preventing malware that masquerades as an accessibility service from operating on the user's device and gaining access to all of the user's information.

Figure 6:
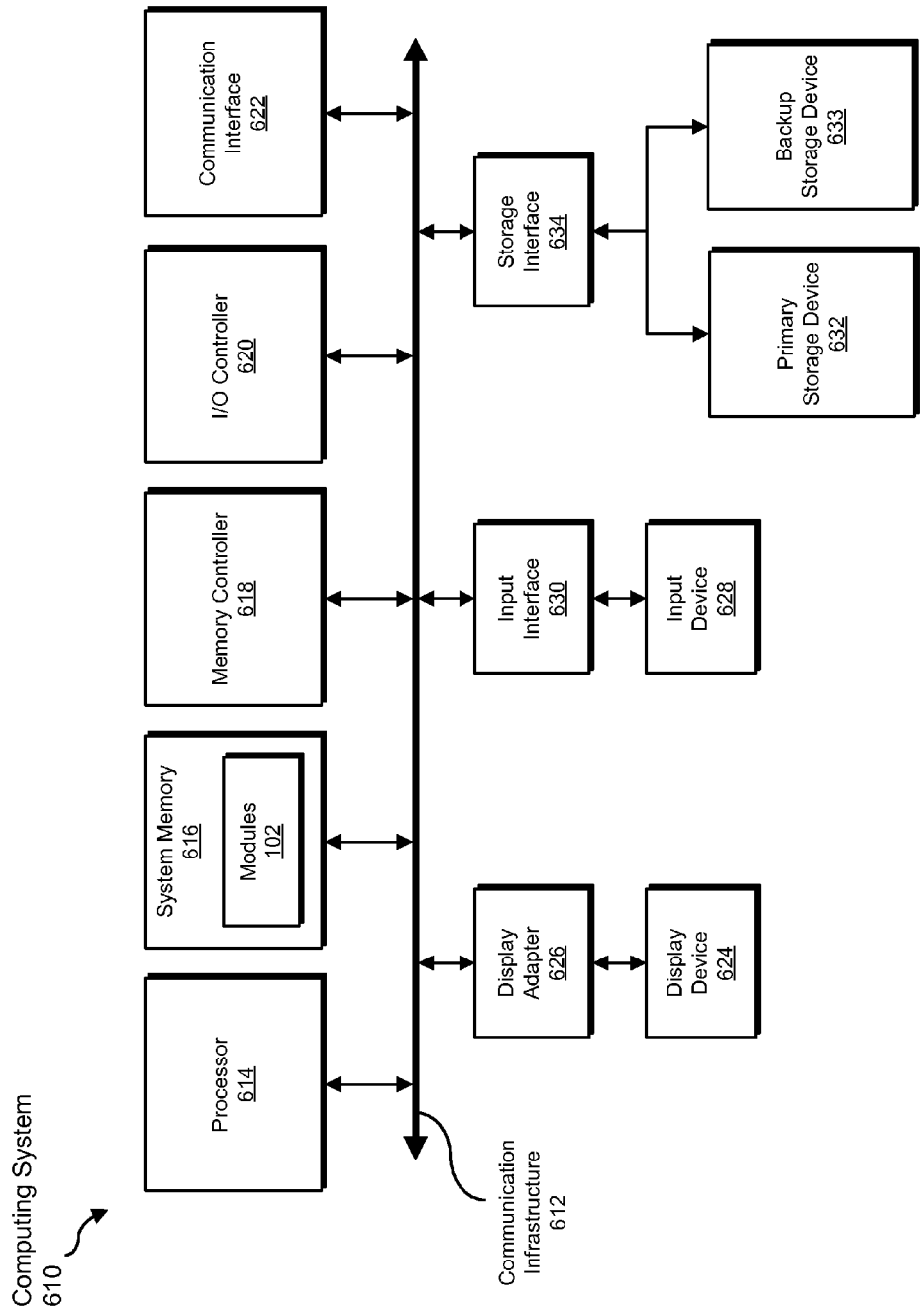
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
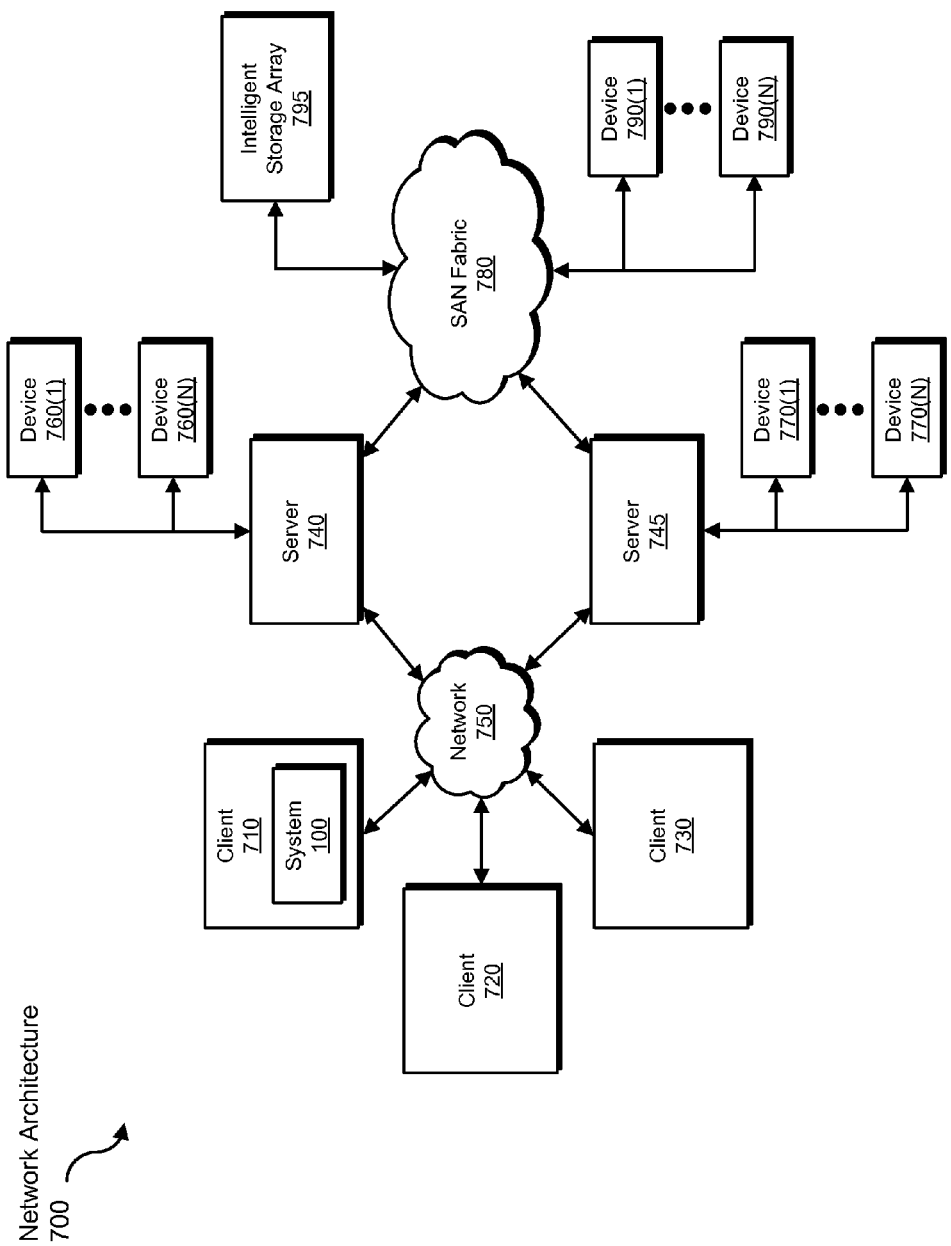
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting computing devices from imposter accessibility services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive accessibility service data to be transformed, transform the accessibility service data into information on the ordering of accessibility services, output a result of the transformation to a set of modules, use the result of the transformation to ensure a security application is the first registered accessibility service, and store the result of the transformation to a file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting computing devices from imposter accessibility services, at least a portion of the method being performed by a computing device comprising at least one processor, the method comprising:
   registering a security application with the computing device as an accessibility service that has special permissions on the computing device that are not available to other applications;
   ensuring that the security application is the first registered accessibility service on the computing device;
   performing, by the security application, a security action after ensuring that the security application is the first registered accessibility service.

2. The computer-implemented method of claim 1, wherein ensuring that the security application is the first registered accessibility service comprises:
   triggering an event on the computing device that will be intercepted by the first registered accessibility service for the computing device;
   determining, based on the security application not intercepting the event, that the security application is not the first registered accessibility service for the computing device;
   performing a remedial action in response to determining that the security application is not the first registered accessibility service for the computing device.

3. The computer-implemented method of claim 2, wherein performing the remedial action comprises prompting a user to configure the computing device such that the security application is the first registered accessibility services.

4. The computer-implemented method of claim 1, wherein performing the security action comprises blocking a malware application from registering itself as the first registered accessibility service due to having the security application already registered as the first registered accessibility service.

5. The computer-implemented method of claim 1, wherein the security action comprises:
   querying the computing device for a list of registered accessibility services;
   querying a reputation database for a reputation for each accessibility service in the list of registered accessibility services.

6. The computer-implemented method of claim 5, further comprising notifying the user of a negative reputation of a registered accessibility service in response to receiving a reply from the reputation database indicating that the registered accessibility service has a negative reputation.

7. The computer-implemented method of claim 5, further comprising prompting the user to provide a reputation rating for a registered accessibility service in response to receiving a reply from the reputation database indicating that the registered accessibility services has not yet been assigned a reputation score.

8. The computer-implemented method of claim 1, wherein the computing device comprises a mobile device.

9. The computer-implemented method of claim 1, wherein the security action comprises:
   determining that a user is viewing a downloadable application;
   determining that the downloadable application will attempt to register as an accessibility service once downloaded to the computing device;
   adjusting a reputation score of the downloadable application based on determining that the downloadable application will attempt to register as an accessibility service.

10. A system including memory for protecting computing devices from imposter accessibility services, the system comprising:
    a registration module, stored in the memory, that registers a security application with the computing device as an accessibility service that has special permissions on the computing device that are not available to other applications;
    an ensuring module, stored in the memory, that ensures that the security application is the first registered accessibility service on the computing device;
    a security module, stored in the memory, that performs, by the security application, a security action after ensuring that the security application is the first registered accessibility service;
    at least one physical processor configured to execute the registration module, the ensuring module, and the security module.

11. The system of claim 10, wherein the ensuring module ensures that the security application is the first registered accessibility service by:

triggering an event on the computing device that will be intercepted by the first registered accessibility service for the computing device;

determining, based on the security application not intercepting the event, that the security application is not the first registered accessibility service for the computing device;

performing a remedial action in response to determining that the security application is not the first registered accessibility service for the computing device.

12. The system of claim 11, wherein the ensuring module performs the remedial action by prompting a user to configure the computing device such that the security application is the first registered accessibility services.

13. The system of claim 10, wherein the security module performs the security action by blocking a malware application from registering itself as the first registered accessibility service due to having the security application already registered as the first registered accessibility service.

14. The system of claim 10, wherein the security action comprises:

querying the computing device for a list of registered accessibility service;

querying a reputation database for a reputation for each accessibility service in the list of registered accessibility services.

15. The system of claim 14, wherein the security module notifies the user of a negative reputation of a registered accessibility service in response to receiving a reply from the reputation database indicating that the registered accessibility service has a negative reputation.

16. The system of claim 14, wherein the security module prompts the user to provide a reputation rating for a registered accessibility service in response to receiving a reply from the reputation database indicating that the registered accessibility services has not yet been assigned a reputation score.

17. The system of claim 10, wherein the computing device comprises a mobile device.

18. The system of claim 10, wherein the security action comprises:

determining that a user is viewing a downloadable application;

determining that the downloadable application will attempt to register as an accessibility service once downloaded to the computing device;

adjusting a reputation score of the downloadable application based on determining that the downloadable application will attempt to register as an accessibility service.

19. A non-transitory computer-readable medium comprising one or more computer-readable instructions that, when executed by at least one processor of a computing device, cause the computing device to:

register a security application with the computing device as an accessibility service that has special permissions on the computing device that are not available to other applications;

ensure that the security application is the first registered accessibility service on the computing device;

perform, by the security application, a security action after ensuring that the security application is the first registered accessibility service.

20. The non-transitory computer-readable medium of claim 19, wherein the one or more computer-readable instructions cause the computing device to ensure that the security application is the first registered accessibility service by:

triggering an event on the computing device that will be intercepted by the first registered accessibility service for the computing device;

determining, based on the security application not intercepting the event, that the security application is not the first registered accessibility service for the computing device;

performing a remedial action in response to determining that the security application is not the first registered accessibility service for the computing device.

* * * * *